(12) United States Patent
Jones

(10) Patent No.: US 8,133,425 B2
(45) Date of Patent: Mar. 13, 2012

(54) ROTARY MOULDING

(75) Inventor: Rory Macpherson Jones, Auckland (NZ)

(73) Assignee: Teal Corporation Limited, Auckland (NZ)

( * ) Notice: Subject to any disclaimer, the term of this patent is extended or adjusted under 35 U.S.C. 154(b) by 0 days.

(21) Appl. No.: 12/457,627

(22) Filed: Jun. 17, 2009

(65) Prior Publication Data

US 2009/0261507 A1    Oct. 22, 2009

Related U.S. Application Data

(63) Continuation of application No. 11/033,969, filed on Jan. 13, 2005, now abandoned.

(30) Foreign Application Priority Data

Jan. 15, 2004 (NZ) ........................................ 530669

(51) Int. Cl.
*B28B 1/02* (2006.01)

(52) U.S. Cl. ...... 264/310; 264/2.1; 264/45.7; 264/209.2; 264/8; 264/312; 264/503; 264/171.29; 264/114; 264/270; 264/311

(58) Field of Classification Search ................. 264/310, 264/2.1, 45.7, 526, 171.29, 503, 209.2, 8, 264/312, 114, 270, 311, 433, 623, 634, 638; 425/401, 402, 418, 560, 562, 812, 294, 272, 425/280, 382.3; 65/516, 602
See application file for complete search history.

(56) References Cited

U.S. PATENT DOCUMENTS

| | | | |
|---|---|---|---|
| 3,350,745 A | 11/1967 | Schott et al. | 425/429 |
| 3,550,206 A | 12/1970 | von der Heide | 425/3 |
| 4,585,021 A * | 4/1986 | Belknap | 137/100 |
| 5,349,984 A | 9/1994 | Weinheimer et al. | 137/543.21 |

* cited by examiner

*Primary Examiner* — Jeffrey Wollschlager
*Assistant Examiner* — Stella Yi
(74) *Attorney, Agent, or Firm* — Jacobson Holman PLLC

(57) ABSTRACT

A valve in a mold as to provide a potential airflow pathway either way, the valving having at least a substantially closed condition from which it can be opened by a pressure differential in one direction that is below that which will cause it to open or fail to allow an airflow in the other direction.

4 Claims, 5 Drawing Sheets

ROTARY MOULDING

This application is a Continuation Application of U.S. patent application Ser. No. 11/033,969, filed Jan. 13, 2005 now abandoned, which claims priority to New Zealand application 530669 filed Jan. 15, 2004. Both of which are incorporated by reference herein.

FIELD OF THE INVENTION

The present invention relates to improvements in respect of rotational moulding, products for use in conjunction with the moulds for rotary moulding, procedures of rotary moulding using such products and related means and methods.

BACKGROUND OF THE INVENTION

Rotational moulding is a process whereby a polymer (typically but not exclusively powdered polyethylene) is placed inside a female mould. The mould is normally in two or more parts and fully encloses the polymer. Typical mould materials are steel or aluminum with a steel or aluminum frame. This mould is then heated (normally by placing the mould in an oven however numerous other methods are used). As the mould is heated the polymer is distributed around the inside of the mould by rotating the mould through two perpendicular axes which themselves are perpendicular to gravity. As the mould heats up the polymer will tend to attach to the walls of the mould. The heat distribution around the inner surface of the mould is one of the major determinants of where the polymer will accumulate (the thickness of the final part will be determined principally by the heat distribution around the inner surfaces of the mould when it was made). Centrifical forces generally play a secondary role in determining polymer accumulation inside the mould. Once sufficient heating is provided the mould is cooled. Normally rotation is continued throughout cooling. After sufficient cooling is provided the rotation can stop and the mould can be opened and the formed part or parts extracted.

In addition to the polymer in the mould there is also often air or some other gas trapped inside the mould. Gases experience significant rates of thermal expansion in comparison to the mould materials. For this reason if the mould is sealed the pressure inside the mould will rise as the air in the mould is heated and will fall as the air inside the mould is cooled. In order to reduce the fluctuations in pressure it is common practice to place a 'vent tube' or breather tube into the mould. A vent tube is a tube that allows gas to flow from the outside of the mould to the inside of the mould. Often a wad of porous material such as cotton wool or fibre glass wool is placed into the tube to stop the polymer from falling out of the mould as the mould rotates. Often this packing material can produce a significant resistance to gas flow through the vent.

In practice we believe most moulds do not fully seal where the different parts of the mould come together (partlines). This results in the mould venting through the partline of the mould until such time as the partline become blocked with polymer. If gas flow through the vent is restricted then once the partlines become blocked the pressure will start to rise in the mould as the gas temperature inside the mould rises. Once cooling starts the pressure inside the mould will start to fall as the temperature of the gas inside the mould also falls. During cooling the gas inside the mould is sealed from the atmosphere surrounding the mould as the polymer normally completely coats the inside of the mould in its entirety. Assuming that the vent remains restricted a vacuum will be created within the moulded part. This vacuum can cause bubbles to be formed in the part in the area of the partline as gas attempts to enter the part within the mould to relieve the vacuum. As the polymer continues to harden with cooling and the vacuum persists then the part may be sucked away from the mould wall. This contributes towards deformation in the finished product.

A positive pressure added to the mould towards the end of the heating cycle is beneficial to production. Positive pressure can also be used during the cooling period to reduce warpage.

Vents can be used to act as one way valves. These valves could use an elastomer that opens to allow air to enter the mould and then close again to stop gas and powder from exiting the mould. Such one way valves would operate reliant on the pressure differential between the gas inside and the gas outside of the mould. Accordingly a positive pressure can be created inside the mould during the final stages of heating which ensures that vacuums are not experienced during the cooling phase.

The major short fall of such a valving system is that it is difficult to control the pressure that builds up within the mould. Moulders would be concerned that pressures within moulds do not appreciate to levels where moulds are damaged or people are injured.

SUMMARY OF THE INVENTION

We have determined that the aforementioned difficulty of under-pressure can be overcome by allowing air to flow one way (i.e, into the mould) and not the other way (i.e. "one way"). We have also determined that there is an advantage to ensure that any such one way valve, or a mould operating with such a one way valve is provided with a feature whereby there can be pressure relief from within the mould upon the attainment of a specified pressure thereby to cater for over-pressure.

We have also determined it is possible with a product that can be inserted into a mould opening (e.g. a valve port to accommodate a valve) to provide for such a one way valving feature in the favoured air ingress way as well as the over-pressure relief in the unfavoured other way.

The present invention therefore in one aspect consists in a method of rotary moulding whereby there is a provision for an airflow (whether of air and/or other gases) into the mould when the pressure differential from without and within the mould favours such an inflow and where there can be an outflow only when there is a pressure differential where the pressure within the mould is above a specified limit with respect to the pressure without the mould.

In some forms of the present invention a valve may accomplish both functions. In other aspects however the separate functions may be provided by different apparatus of or and/or associated with the mould.

Preferably however a one way valve is provided in the mould to accomplish both functions and is adapted to fail (as a one way valve) when the pressure is above a relatively low specified pressure and certainly much less than that which would create potential mould damage. Preferably the threshold pressure is below a 5 bar differential and most preferably is below a 2 bar differential. In a preferred form, preferably the one way character of the valve is to be disrupted by a threshold differential pressure within the range of from 0 to 1 bar above the atmospheric pressure outside of the mould.

An aspect of such a venting provision is a reduction "R" and then expansion "E" in the heat transfer pathway, (see FIGS. 4, 8 and 9).

It is believed that the provision in the rotational moulding of such valving feature(s) (whether a unitary valve or multiple valving system) which will restrict airflow in one direction but fail when a predefined pressure is attained thereby to allow pressure relief is new and inventive.

In another aspect the present invention consists in a mould modified for use in a method as previously stated and/or including optionally a valving feature substantially as hereinafter described.

In another aspect, in or for a rotation mould, a venting feature which has the ability to allow a gas ingress to the mould at a pressure differential below that required to allow gas egress from the mould. The invention also consists in the use of such feature.

Such pressure differential that acts as a gas egress threshold, when considered from the opposite condition (i.e. favouring ingress rather than egress), can preferably be exceeded during gas ingress i.e. there can be a gas (e.g. air) inflow over a wide pressure differential.

In yet a further aspect the present invention consists in a moulded valve component or moulded valve, said component and/or valve being adapted for insertion and retention in a mould so as to provide a potential airflow pathway either way, the valving being characterised in that it has at least a substantially closed condition from which it can be opened by a pressure differential in one direction that is below that which will cause it to open or fail to allow an airflow in the other direction.

Preferably the item is a moulded item, for example, in the form of a plug defining a closed passageway, the passageway being adapted to be splayed open or otherwise open at its closed end by airflow in the one way direction and to fail by deformation and/or parting in an outward flow direction to allow the over-pressure outflow in the other way.

Preferably the item is substantially as hereinafter described with reference to any one or more of the accompanying drawings.

As used herein the term "and/or" includes "and" or "or".

As used herein the term "s" following a noun means as might be appropriate the plural or singular forms of that noun.

As used herein the term "valve" can include a component of a valving assembly.

As used herein "mould pressure" includes the gauge pressure of the gas inside a mould.

As used herein "mould over-pressure" means a positive gauge pressure of the gas inside the mould.

BRIEF DESCRIPTION OF THE DRAWING

A preferred form of the present invention will now be described with reference to the accompanying drawings in which.

DETAILED DESCRIPTION OF THE PREFERRED EMBODIMENTS

In the preferred form the present invention is envisaged that the one way air ingress control and the over-pressure air egress control is with a single valving product typified by plug 1 (e.g. 22.5 mm in largest dimension) of a suitable elastomeric material (e.g. a silicone) moulding (e.g. to plug a 14 mm hole) preferably provided with cuts, moulded scores, lines of frangibility, etc preferably into a domed passageway closure 2 which will provide the differential capability in gas flow in the respective directions.

Reference herein to "air" should be considered as covering any suitable fluid as it may well be that gases issue from a polymer during rotational moulding and add to any over-pressure air (if in fact it is air as opposed to another gas) that has been allowed to ingress into the mould from the ambient surrounds.

Figure 6A:
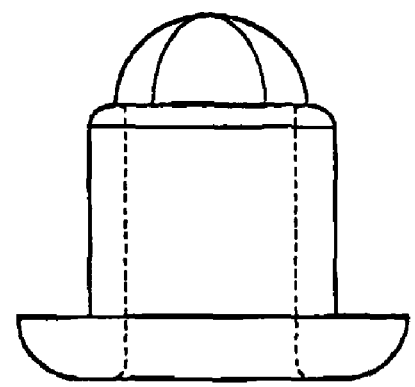
FIG. 6A closed with a cross cut into the passageway closing dome in a relaxed airflow occluding condition.
Figure 6B:
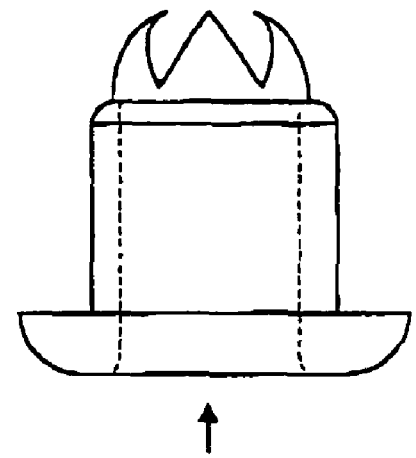
FIG. 6B shows an airflow in the arrowed one way favoured direction whereby the cross cut into the dome splays outwardly to allow air to enter the mould.
Figure 6C:
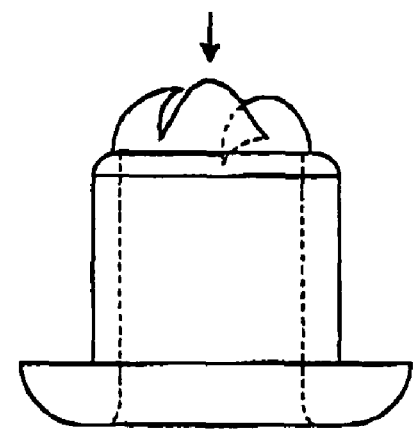
FIG. 6C shows deformation of the cross cut dome from a closed condition as shown in FIG. 6A to a pressure release condition (preferably from which it can return to the condition as shown in FIG. 6A but not necessarily so)
Figure 7A:
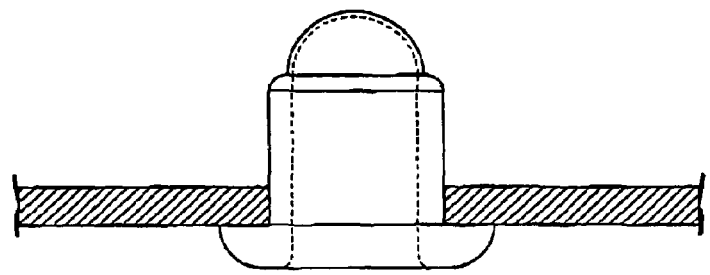
FIGS. 7A to 7C shows, in a mould wall, a variant scenario to that of FIGS. 6A to 6C, FIG. 7A showing the plug valve in a closed condition such as might be attained where the inside/outside pressure differential is from 0 to 0.2 BAR, FIG. 7B showing air ingress into the mould at a pressure differential below 0, and FIG. 7C showing air/gas egress from the mould as a consequence of plug valve deformation (as arrowed) when the pressure differential is above 0.2 BAR, the dome consequently being opened to allow the arrowed outflow.
Figure 7B:
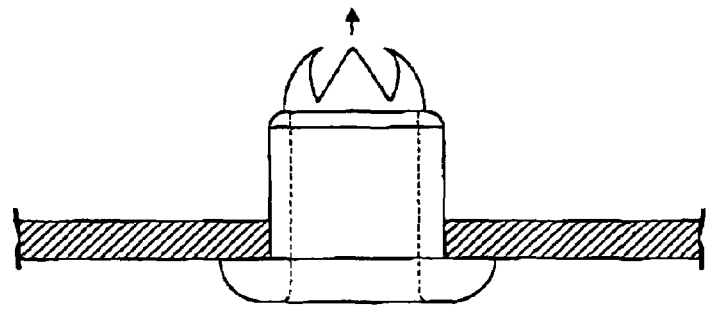
Figure 7C:
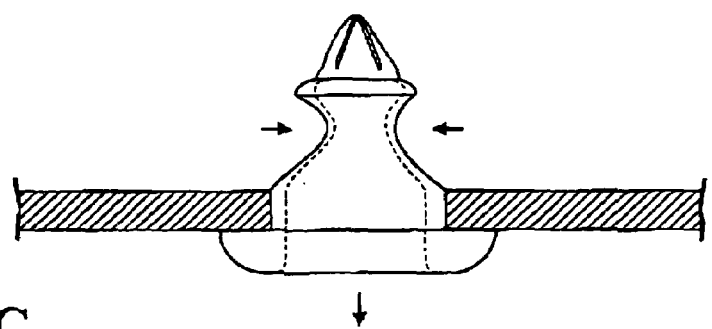

Ideally the elastomer chosen will be one that will resist high temperature damage yet has sufficient-flexibility and resilience to allow some resumption of the condition as shown in FIG. 6A having reached a one way fail as shown in FIG. 6C.

The present invention with its simple provision of a product capable of being retained in any appropriate manner (adhesively, interference fit, clip fit, etc.) in the wall or some connect of a mould 3 will allow with its dome 2 as shown (and depending on the choice of the particular product that might be used) some variation of the valve performance to release at different pressures from within the mould. It is proposed by way of example that different versions of the product can be made available which will release at different pre-determined mould over-pressures. These over-pressures may be of the order of, by way of example, (but in no way restrictively) 0.05, 0.1, 0.2, 0.3, 0.4, and 0.5 bar gauge.

Whilst therefore it is preferred that the designed failure to the condition such as that typified in FIG. 6c is to occur in the range up to 1 bar above the atmospheric pressure outside the mould, this is not necessarily so since there may well be moulding situations where much higher thresholds are required prior to venting from within the mould.

Figure 1:
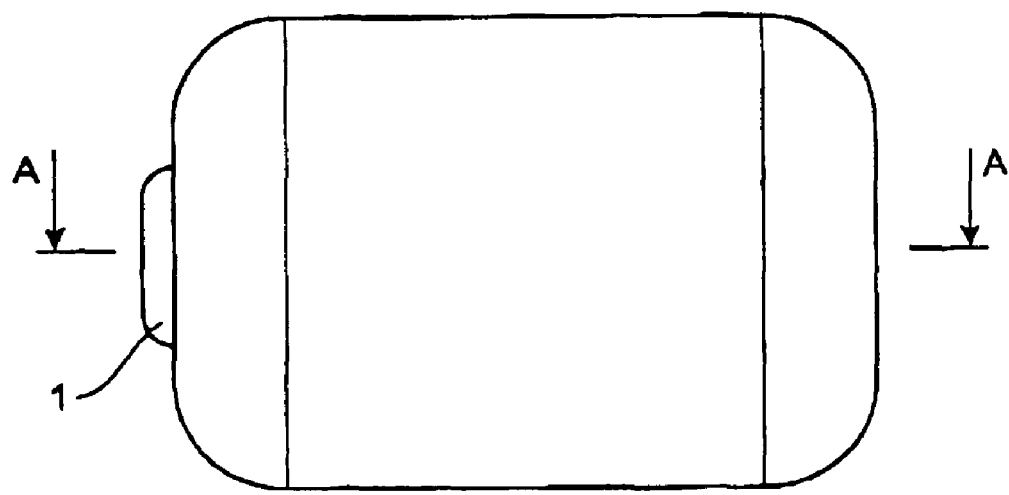
FIG. 1 shows a diagram of a simple rotary mould having as a plug a valving product in accordance with the present invention inserted into the wall of the mould or part thereof.
Figure 2:
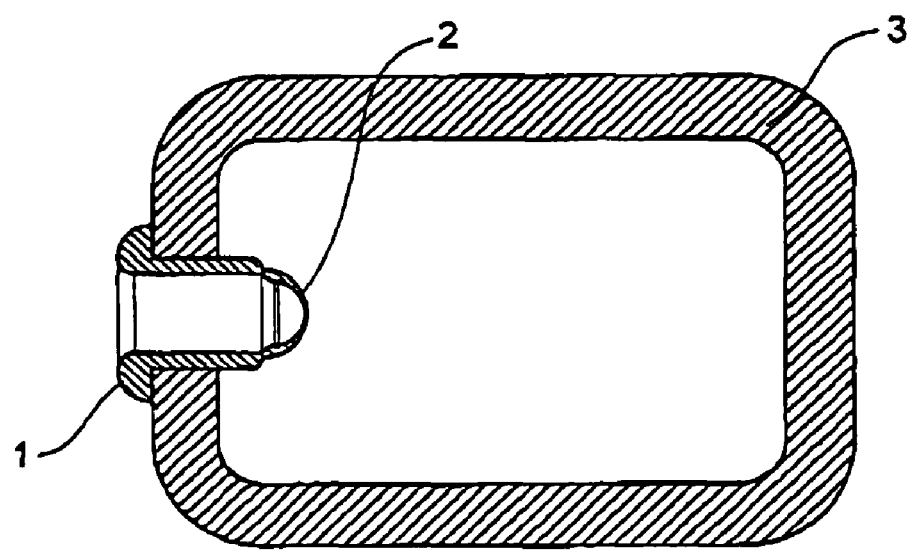
FIG. 2 is the section AA of the assembly of FIG. 1.
Figure 3:
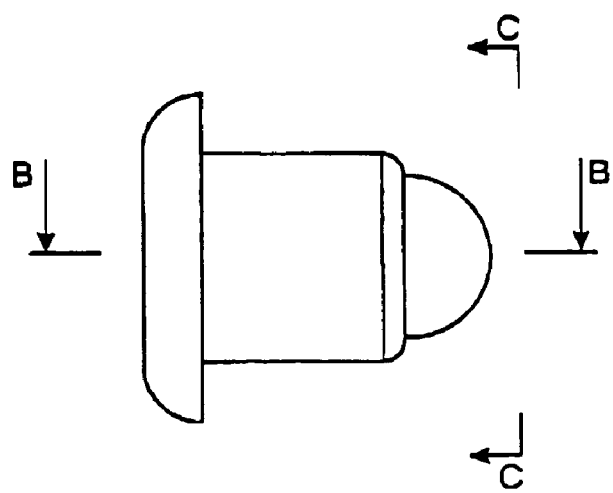
FIG. 3 is a side elevational view of a plug one way valve in accordance with the present invention.
Figure 4:
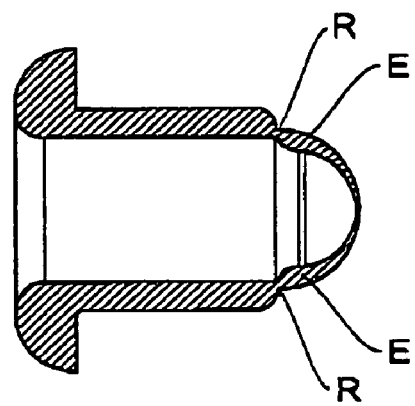
FIG. 4 is a section of the plug valve of FIG. 3 taken at BB.
Figure 5:
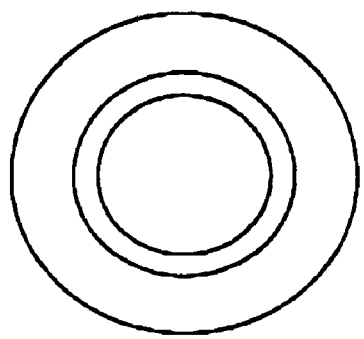
FIG. 5 is a end view CC of the plug valve of FIG. 3, FIGS. 6A to 6C show respectively a form of plug valves akin to that of FIGS. 3 to 5 in the following modes.
Figure 8:
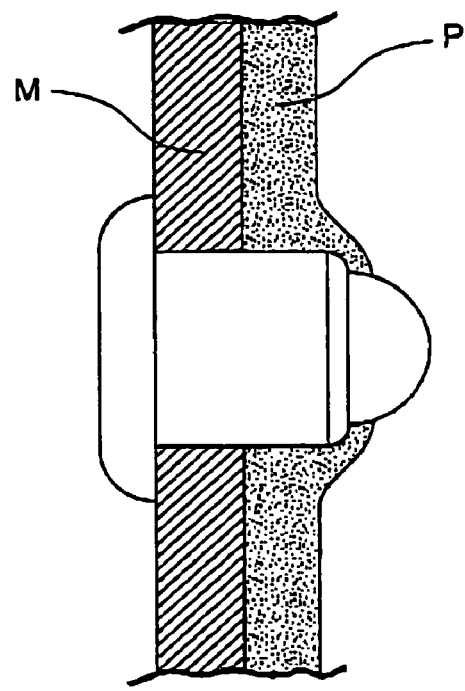
FIG. 8 shows a polymer "P" build-up within the mould "M" about and in part only on the plug valve as a consequence of the reduction "R" and expansion "E" shown [see FIG. 4]
Figure 9:
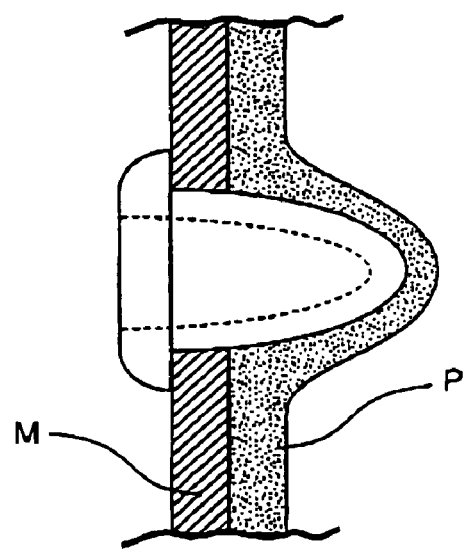
FIG. 9 shows an unwanted polymer "P" build-up possible were the reduction "R" and expansion "E" not incorporated in the plug valve.

As indicated previously the use of a design in accordance with the present invention has been designed to exhibit a reduction "R" and then expansion "E" in the heat transfer path thus to reduce the silicone temperature of the material in the dome. This is to ensure that the polymer being moulded in the mould is less likely to attach to the valve. See FIGS. 4, 8 and 9.

The present invention therefore has proposed a procedure of moulding, moulds and components of moulds which do more than what has hitherto been used or proposed i.e. there will be release in a desired pressure range preferably reliant upon a plug valve which exhibits a preference to allowing air to flow one way (i.e. into the mould) and not the other way. That same plug valve also has a threshold above which it will fail or vent and thus allow venting out from the mould. Alternatively it can be designed to require a threshold pressure differential to allow air ingress yet a higher threshold pressure differential to allow air egress.

It is believed therefore that such proposals in the rotational moulding will be well received.

I claim:

1. A method of rotary moulding with a rotary mould, said method comprising the steps of inserting a plug valve as a valving insert into an opening of the rotary mould and into a mould space, at least substantially sealing the mould space from ambient air, controlling air inflow into the rotary mould from unducted ambient air, and controlling fluid outflow from the mould space, the plug valve having a passageway, providing flow of gas into the mould through the plug valve when a pressure differential from outside the mould and inside the mould favors an inflow of air into the rotary mould, and providing an outflow of gas from the rotary mould through the plug valve only when there is a pressure differential where a pressure inside the mould is above a specified limit with respect to a pressure outside the mould so that (A) in use, the passageway of the plug valve is opened by resiliently opening at least in part a closed end of the passageway responsive to a pressure differential, ambient air to mould space, above a first threshold pressure to allow, as in a one way valve, an ambient air inflow, and (B) in use, the passageway is opened by failure at least in part of the closed end of the passageway by deformation or parting, or both, to allow an outflow of air or gas responsive to a pressure differential, mould space to ambient air, above a second threshold pressure higher than the first threshold pressure.

2. The method of claim 1, wherein the second threshold pressure is below a 5 bar differential.

3. The method of claim 2, wherein the second threshold pressure is below a 2 bar differential.

4. The method of claim 1, wherein the differential pressure is within the range of from 0 to 1 bar above atmospheric pressure outside of the mould.

* * * * *